(12) United States Patent
Wiesner et al.

(10) Patent No.: US 9,195,524 B1
(45) Date of Patent: Nov. 24, 2015

(54) HARDWARE SUPPORT FOR PERFORMANCE ANALYSIS

(75) Inventors: Robert Wiesner, Chandler, AZ (US); Tom Hameenanttila, Phoenix, AZ (US)

(73) Assignee: Marvell International Ltd. (BM)

( * ) Notice: Subject to any disclaimer, the term of this patent is extended or adjusted under 35 U.S.C. 154(b) by 221 days.

(21) Appl. No.: 13/311,988

(22) Filed: Dec. 6, 2011

Related U.S. Application Data

(60) Provisional application No. 61/425,125, filed on Dec. 20, 2010.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ...................................... *G06F 9/542* (2013.01)

(58) Field of Classification Search
None
See application file for complete search history.

(56) References Cited

U.S. PATENT DOCUMENTS

| | | | |
|---|---|---|---|
| 6,098,169 A * | 8/2000 | Ranganathan | 712/227 |
| 6,678,847 B1 * | 1/2004 | Perry et al. | 714/727 |
| 7,571,076 B2 * | 8/2009 | Matsuzaki et al. | 702/182 |
| 7,793,261 B1 * | 9/2010 | Edwards et al. | 717/124 |
| 8,407,528 B2 * | 3/2013 | Larson | 714/45 |
| 2007/0226473 A1 * | 9/2007 | Kapustin et al. | 712/227 |
| 2007/0288931 A1 * | 12/2007 | Avkarogullari | 719/312 |
| 2008/0127216 A1 * | 5/2008 | Bueti et al. | 719/318 |
| 2011/0173503 A1 * | 7/2011 | Salapura et al. | 714/45 |

* cited by examiner

*Primary Examiner* — H S Sough
*Assistant Examiner* — William C Wood

(57) ABSTRACT

Systems, methods, and other embodiments associated with echo cancellation are described. According to one embodiment, an apparatus includes a plurality of first registers configured to respectively store information related to a performance of a processor and a second register in communication with each of the plurality of first registers. The apparatus also includes logic configured to detect a trigger event; and in response to having detected the trigger event, copy the information related to the performance of the processor respectively in the plurality of first registers into the second register.

18 Claims, 3 Drawing Sheets

HARDWARE SUPPORT FOR PERFORMANCE ANALYSIS

CROSS REFERENCE TO RELATED APPLICATIONS

This patent disclosure claims the benefit of U.S. Provisional Application No. 61/425,125 filed on Dec. 20, 2010, which is incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Performance analysis tools allow a developer to optimize software and hardware settings to allow a processor to perform operations at different speeds and/or with different levels of energy consumption to meet certain performance requirements of a given application. Performance analysis tools allow a developer to find bottlenecks and provide information on where to improve the software or hardware settings. Software-based performance analysis through instrumentation is widely available for non embedded processors with limited operating systems, such as processors for personal computers. Performance analysis tools for embedded processors—e.g., processors for smart phones—face challenges due to the limited resources and real time performance requirements on embedded processors.

SUMMARY

In one embodiment an apparatus includes a plurality of first registers configured to respectively store information related to a performance of a processor and a second register in communication with each of the plurality of first registers. The apparatus also includes logic configured to detect a trigger event; and in response to having detected the trigger event, copy the information related to the performance of the processor respectively store in the plurality of first registers into the second register.

In another embodiment, a method includes storing, in a plurality of first registers, information related to a performance of a processor. The method also includes detecting a trigger event; and in response to having detected the trigger event, copying the information related to a performance of a processor stored in the first plurality of registers into a second register.

In another embodiment a system-on-chip includes a core processor configured to store information related to the performance of the processor in a plurality of first registers. The core processor also includes a debug interface for communication of processor performance information. The core processor also includes a second register accessible to the debug interface and logic configured to detect a trigger event. In response to having detected the trigger event, the logic is configured to copy the information related to the performance of the processor respectively stored in the plurality of first registers into the second register.

BRIEF DESCRIPTION OF THE DRAWINGS

The accompanying drawings, which are incorporated in and constitute a part of the specification, illustrate various systems, methods, and other embodiments of the disclosure. The element boundaries (e.g., boxes, groups of boxes, or other shapes) shown in the figures represent one example of the boundaries. In some examples one element may be implemented as multiple elements or multiple elements may be implemented as one element. In some examples, an element shown as an internal component of another element may be implemented as an external component and vice versa.

DETAILED DESCRIPTION

Described herein are example systems, methods, and other embodiments associated with providing hardware support for performance analysis with minimal use of processor resources. Statistical performance analysis is a performance analysis technique that is based on a software-implemented data collector running on a target processor. The data collector uses system resources like memory, a timer interrupt, and so on. For processors with limited system resources (e.g., embedded core processors in a system-on-chip) the amount of system resources necessary to implement the data collector may become prohibitive.

In one embodiment, hardware support for statistical performance analysis of a core processor is provided by storing a snapshot of the contents of performance-related registers in a register (referred to herein as a "snapshot register") that can be accessible through a debug interface on the core processor. The core processor's operations are not stopped to access the performance related registers. The snapshot register can be read by a data collector external to the core processor, dramatically lessening the core processor's system resources that are utilized for performance analysis.

Figure 1:
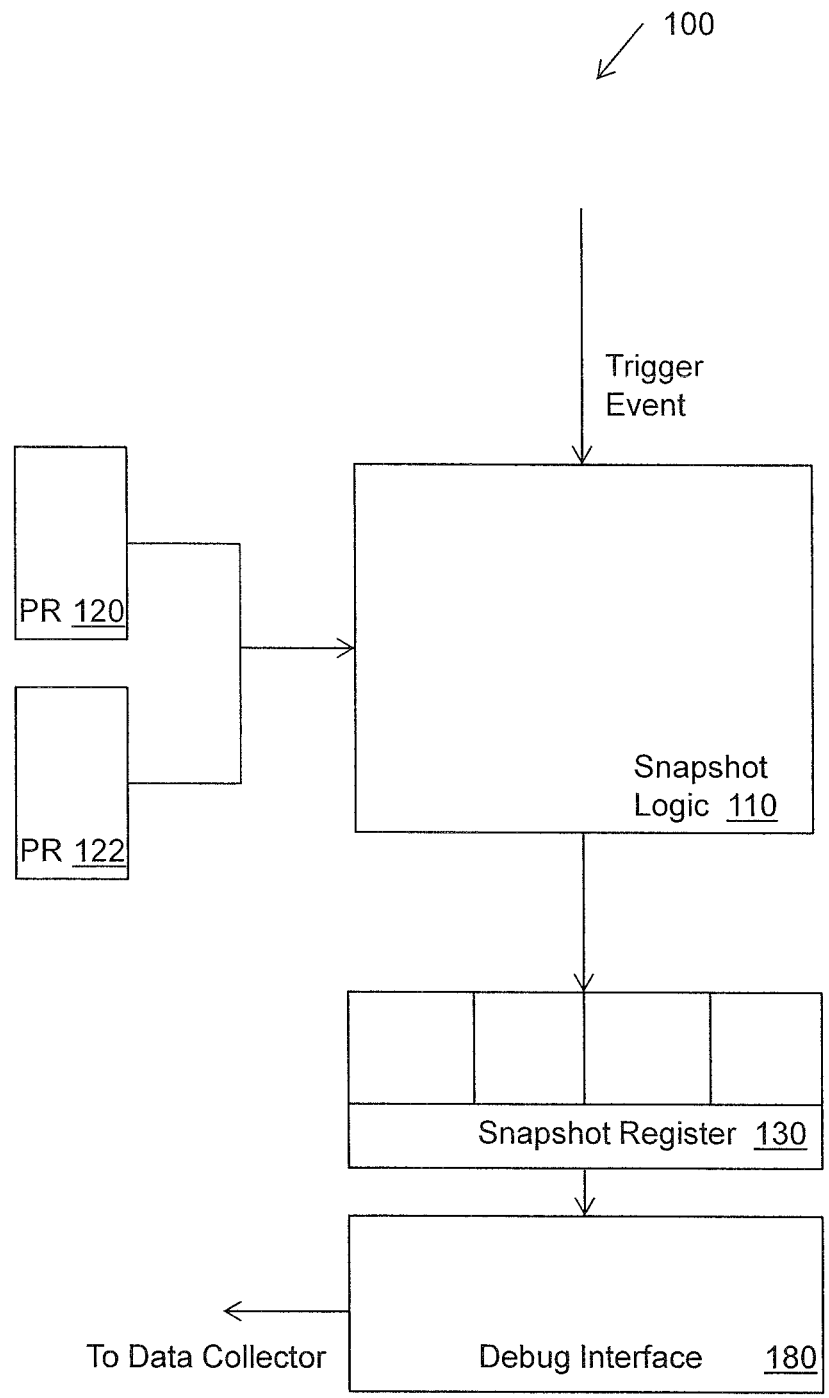
FIG. 1 illustrates one embodiment of an apparatus associated with hardware support for performance analysis.

With reference to FIG. 1, one embodiment of an apparatus 100 is shown that is associated with hardware support for performance analysis. The apparatus 100 includes logic (referred to herein as "snapshot logic") 110 that, in response to a trigger event, copies the contents of performance-related registers 120, 122 into the snapshot register 130. The snapshot register 130 can be read through a debug interface 180 by a data collector (not shown) that collects data for use in performance analysis.

The performance-related registers 120, 122 store performance-related information for a processor. In one embodiment, one performance-related register is a program counter register 120 that stores a value of a program counter. The value of the program counter register 120 corresponds to a location in a program at which a certain event is taking place, and allows a developer to locate problem areas in the software program. The other performance-related register is a Performance Monitoring Unit (PMU) register 122 that stores performance data information identifying a particular type of performance issue. For example, in an ARM core processor, the PMU register 122 stores data identifying cache misses, stall cycles, branch misses, and so on. By reading the value of the program counter register 120 and the PMU register 122, a developer can determine at which particular location in a software program a particular performance issue occurred.

The contents of the PMU register 122 and program counter register 120 typically change at an operating speed of the processor, while communication through the debug interface 180 is typically much slower than the operating speed of the processor. Thus, if the contents of the PMU register 122 and program counter register 120 are read directly through the debug interface 180, without the use of the snapshot register 130, thousands of instructions execute during operation of the processor between each read of the PMU register and the program counter register 120. This would result in a misalignment between the program counter register 120 and the PMU register 122 so that the performance issue identified in the PMU register 122 may not have occurred at the location identified in the program counter register 120. By storing the contents of the program counter 120 and PMU register 122 in the snapshot register 130, the contents are aligned in time, and the snapshot register provides meaningful performance information when read through the debug interface 180.

While the program counter register and performance data register support basic performance analysis, other information is useful in optimizing more complex processing systems that may run multiple applications on multiple core processors. To this end, other performance related registers (not shown) may be copied into the snapshot register 130. To facilitate performance analysis on complex processing systems, other performance-related registers may store a context identifier, a global timer value, page table information, and/or a core mode. The context identifier (e.g., process identifier or thread identifier) identifies a particular application that is running so that a developer can tell which program the program counter is referring to. The global timer is an overall timer that chronologically aligns multiple core processors that are operating in a system-on-chip. The global timer is useful in correlating operation of one core processor with the operation of another core processor to identify interactions therebetween. The page table information may help identify memory access issues while the core processor mode information may be useful in identifying energy consumption issues.

The values of the context identifier, global timer value, page table information, and core mode are not accessible through the debug interface 180 in most core processors. Thus, it is not possible to directly read the values of the context identifier, a global timer value, a page table, and a core mode registers through the debug interface 180. By copying the contents of performance-related registers that store a context identifier, a global timer value, a page table, and/or a core mode into the snapshot register 130, more complete performance information can be made available through the debug interface 180.

The snapshot logic 110 stores time-aligned values of the program counter register 120 and the PMU register 122 in the snapshot register 130 to enable collection of the performance data in the performance-related registers by a data collector (not shown) through the debug interface 180. The snapshot logic 110 is triggered to store the contents the program counter register 120 and the PMU register 122 in the snapshot register 130 by a trigger event. In one embodiment, the trigger event is generated by the data collector (not shown). For example, the trigger event could be a read operation being performed on the program counter register 120 through the debug interface 180.

Figure 2:
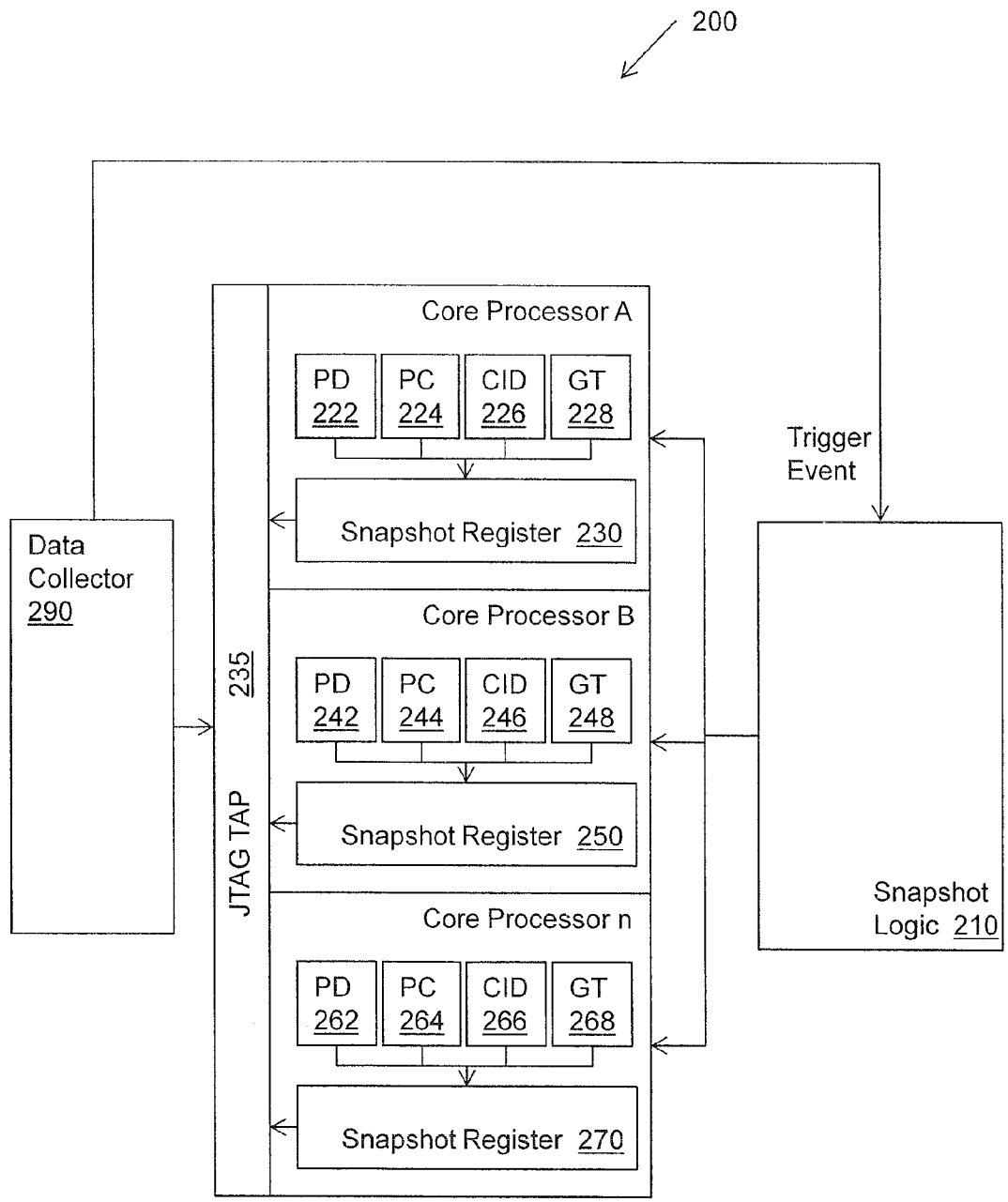
FIG. 2 illustrates one embodiment of an apparatus associated with hardware support for performance analysis.

With reference to FIG. 2, one embodiment of a system-on-chip 200 is shown that provides hardware support for performance analysis. The system-on-chip 200 includes multiple core processors A-n. Each core processor includes a snapshot register 230, 250, 270 that is accessible to a data collector 290 through a debug interface. In one embodiment, the debug interface is a JTAG TAP (Test Access Point) 235. JTAG (Joint Test Action Group) is a protocol by which performance-related information is provided through a standard four pin serial interface on a processor. A JTAG TAP is the four pin interface through which data in JTAG accessible registers can be read and manipulated.

The core processors A-n include four performance-related registers that store performance related information for the processor. Performance Data registers 222, 242, 262 store an identifier that corresponds to a particular performance issue such as cache misses, branch misses, stall cycles, and so on. In some embodiments, the core processors A-n are ARM core processors and the PD registers 222, 242, 262 are PMU registers. Program Counter registers 224, 244, 264 store a program counter value. Context ID registers 226, 246, 266 store a process or thread identifier. Global Timer registers 228, 248, 268 store a global timer value corresponding to a global clock count that correlates operation of the multiple core processors.

The system-on-chip 200 also includes a snapshot logic 210. The snapshot logic 210 responds to a trigger event from the data collector 290 to i) store the contents of the performance-related registers 222, 224, 226, 228 in the snapshot register 230, ii) store the contents of the performance-related registers 242, 244, 246, 248 in the snapshot register 250, or iii) store the contents of the performance-related registers 262, 264, 266, 268 in the snapshot register 270, depending on which core processor the data collector 290 is accessing. In some embodiments, the contents of performance-related registers on more than one core processor are stored in snapshot registers simultaneously.

The snapshot logic 210 monitors access operations by the data collector 290 on the JTAG TAP 235 and copies the contents of the performance-related registers in a core processor when a trigger event occurs. In one embodiment, the trigger event is a read operation being performed on the program counter register 224, 244, 264. Other events that indicate that the data collector 290 is ready to read another snapshot of performance data may be used as trigger events. The snapshot logic 210 is shown as a single logic that controls the copying of performance-related registers into snapshot registers in all the core processors. A separate snapshot logic could be associated with each core processor.

Figure 3:
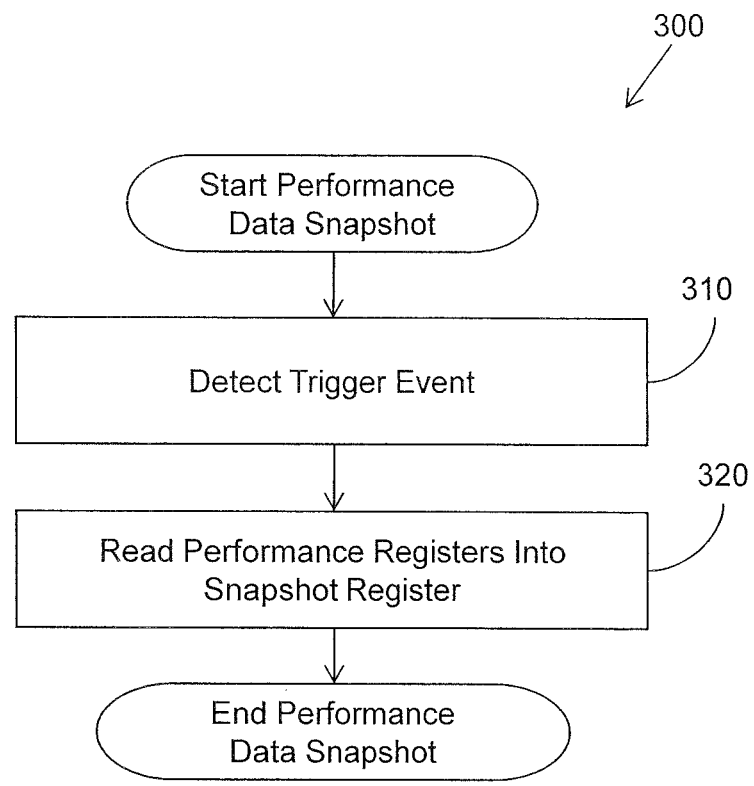
FIG. 3 illustrates one embodiment of a method associated with hardware support for performance analysis.

With reference to FIG. 3, one embodiment of a method 300 is shown that is associated with generating a performance data snapshot. At 310, the method includes detecting a trigger event. At 320, in response to the trigger event, the contents of the two or more performance-related registers are stored in a snapshot register. In one embodiment, after the contents of the two-or more performance-related registers are stored in the snapshot register, a profile data snapshot package may be generated to be sent to an external data collector using a transportation layer (e.g., USB 3.0, TCP/IP). The snapshot package includes additional information necessary to properly interface with the transportation layer.

Using the method 300 to capture performance-related information in the snapshot register means that all performance related information can be made available to a data collector through a debug interface. Generating the performance data for analysis will not significantly impact the system. The data collector device can read the snapshot register through the JTAG TAP independent of the processor's operating speed. After collecting the performance data, external software can be used to analyze the statistical data without requiring processor memory or porting a data collector to the processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, this application is intended to embrace alterations, modifications, and variations that fall within the scope of the appended claims.

What is claimed is:

1. An apparatus, comprising:
 a processor comprising:
 a debug interface;
 a plurality of first registers configured to respectively store contents corresponding to information related to a performance of the processor; wherein at least one of the first registers cannot be accessed by way of the debug interface;
 a second register in communication with each of the plurality of first registers, wherein the second register is configured to store the contents of the plurality of first registers;
 wherein the second register is accessible by way of the debug interface; and
 logic configured to:
 detect a trigger event, wherein the trigger event comprises access to at least one first register through the debug interface; and
 in response to having detected the trigger event, copy the contents of the first registers into the second register.

2. The apparatus of claim 1, wherein:
 the information related to the performance of the processor is based on the processor executing a program in accordance with a program counter;
 the plurality of first registers comprises a third register configured to store a value of the program counter as the processor executes the program; and
 in response to having detected the trigger event, the logic is configured to copy the value of the program counter into the second register.

3. The apparatus of claim 2, wherein the trigger event comprises a read operation on one or more of the plurality of first registers.

4. The apparatus of claim 1, wherein the debug interface comprises a Joint Test Action Group (JTAG) Test Access Point (TAP).

5. The apparatus of claim 1, wherein the second logic is further configured to generate a snapshot package that includes the contents of the second register and additional information necessary for transport to an external data collector.

6. The apparatus of claim 1, wherein the plurality of first registers comprise at least two or more of a program counter register, a global timer register, a context identifier register, and a performance data register.

7. A method, comprising:
 storing, in a plurality of first registers, contents corresponding to information related to a performance of a processor, wherein the plurality of first registers is internal with respect to the processor, further wherein at least one of the first registers is not accessible through a debug interface on the processor;
 detecting a trigger event, wherein the trigger event comprises access to at least one first register through the debug interface;
 in response to having detected the trigger event, copying the contents of the first plurality of registers into a second register, wherein the second register is internal with respect to the processor.

8. The method of claim 7, wherein detecting a trigger event comprises detecting a read operation on one or more of the plurality of first registers.

9. The method of claim 7, further comprising generating a snapshot package that includes the contents of the second register and additional information necessary for transport to an external data collector.

10. The method of claim 7, further comprising reading the contents of the second register through a JTAG TAP.

11. The method of claim 7, wherein copying the contents of the plurality of first registers into the second register comprises copying contents of at least two or more of a program counter register, a global timer register, a context identifier register, and a performance data register in the second register.

12. The method of claim 7, wherein copying contents of the plurality of first registers into the second register comprises storing the contents of a plurality of first registers associated with a first processor and a second processor in respective second registers associated with the first processor and the second processor.

13. A system-on-chip comprising:
 a core processor comprising:
 a debug interface for communication of processor performance information;

a plurality of first registers configured to store contents corresponding to information related to the performance of the core processor, where at least one of the first registers is not accessible to the debug interface;

a second register configured to store the contents of the plurality of first registers, wherein the second register is accessible to the debug interface; and logic configured to:

detect a trigger event, wherein the trigger event comprises access to at least one first register through the debug interface; and in response to having detected the trigger event, copy the contents of the plurality of first registers into the second register.

14. The system-on-chip of claim 13, wherein the debug interface comprises a JTAG TAP.

15. The system-on-chip of claim 13, further comprising:

a second core processor comprising;

a plurality of first registers configured to store contents corresponding to information related to the performance of the second processor; and a second register configured to store contents of the plurality of first registers for the second core processor, wherein the second register is accessible to the debug interface; and wherein the logic is configured to copy the contents of the plurality of first registers for the second processor into the second register for the second processor in response to a trigger condition.

16. The system-on-chip of claim 13, wherein the logic is further configured to generate a snapshot package that includes the contents of the second register and additional information needed for transport to an external data collector.

17. The system-on-chip of claim 13, wherein the plurality of first registers comprise at least two or more of a program counter register, a global timer register, a context identifier register, and a performance data register.

18. The system-on-chip of claim 13, wherein the trigger event is a read instruction from a data collector to read one or more of the plurality of first registers.

* * * * *